United States Patent
Moniz et al.

(10) Patent No.: US 10,519,860 B2
(45) Date of Patent: Dec. 31, 2019

(54) TURBINE FRAME AND BEARING ARRANGEMENT FOR THREE SPOOL ENGINE

(71) Applicant: General Electric Company, Schenectady, NY (US)

(72) Inventors: Thomas Ory Moniz, Loveland, OH (US); Alan Roy Stuart, Cincinnati, OH (US); Jeffrey Donald Clements, Mason, OH (US); Brandon Wayne Miller, Liberty Township, OH (US); Darek Tomasz Zatorski, Fort Wright, KY (US)

(73) Assignee: General Electric Company, Schenectady, NY (US)

( * ) Notice: Subject to any disclaimer, the term of this patent is extended or adjusted under 35 U.S.C. 154(b) by 643 days.

(21) Appl. No.: 15/451,498

(22) Filed: Mar. 7, 2017

(65) Prior Publication Data

US 2018/0258858 A1    Sep. 13, 2018

(51) Int. Cl.
| | | |
|---|---|---|
| *F01D 25/16* | (2006.01) | |
| *F02C 7/06* | (2006.01) | |
| *F02C 3/067* | (2006.01) | |
| *F01D 5/06* | (2006.01) | |
| *F01D 1/24* | (2006.01) | |
| *F01D 11/00* | (2006.01) | |
| *F02C 7/28* | (2006.01) | |
| *F02K 3/072* | (2006.01) | |
| *F01D 25/18* | (2006.01) | |

(52) U.S. Cl.
CPC ............... *F02C 7/06* (2013.01); *F01D 1/24* (2013.01); *F01D 5/06* (2013.01); *F01D 11/001* (2013.01); *F01D 25/162* (2013.01); *F02C 3/067* (2013.01); *F02C 7/28* (2013.01); *F01D 25/183* (2013.01); *F02K 3/072* (2013.01); *Y02T 50/672* (2013.01)

(58) Field of Classification Search
CPC .... F02C 7/06; F02C 3/067; F01D 1/24; F01D 25/16; F01D 25/162
See application file for complete search history.

(56) References Cited

U.S. PATENT DOCUMENTS

| | | | |
|---|---|---|---|
| 3,956,887 A | 5/1976 | MacDonald | |
| 4,704,862 A * | 11/1987 | Dennison | .................. F01D 7/00 416/162 |

(Continued)

OTHER PUBLICATIONS

International Search Report and Written Opinion issued in connection with corresponding PCT Application No. PCT/US2018/016433 dated May 18, 2018.

*Primary Examiner* — Ninh H. Nguyen
(74) *Attorney, Agent, or Firm* — Dority & Manning, P.A.

(57) ABSTRACT

The present disclosure is directed to a gas turbine engine defining a radial direction, a circumferential direction, an axial centerline along a longitudinal direction. The gas turbine engine defines an upstream end and a downstream end along the longitudinal direction and includes a turbine frame defined around the axial centerline. The turbine frame includes a first bearing surface, a second bearing surface, and a third bearing surface. The first bearing surface corresponds to a first turbine rotor, the second bearing surface corresponds to a second turbine rotor, and the third bearing surface corresponds to a third turbine rotor, and each turbine rotor is independently rotatable.

19 Claims, 4 Drawing Sheets

(56) References Cited

U.S. PATENT DOCUMENTS

| | | | |
|---|---|---|---|
| 4,860,537 A | 8/1989 | Taylor | |
| 5,103,635 A | 4/1992 | Lardellier | |
| 6,763,654 B2 | 7/2004 | Orlando et al. | |
| 7,048,496 B2 | 5/2006 | Proctor et al. | |
| 7,269,938 B2 * | 9/2007 | Moniz | F01D 25/16 415/68 |
| 7,716,914 B2 | 5/2010 | Schilling | |
| 7,966,806 B2 | 6/2011 | Henry et al. | |
| 8,371,127 B2 * | 2/2013 | Durocher | F01D 5/082 415/115 |
| 8,708,643 B2 | 4/2014 | Griffin et al. | |
| 9,494,077 B2 | 11/2016 | Chanez et al. | |
| 2006/0093465 A1 | 5/2006 | Moniz et al. | |
| 2008/0031727 A1 | 2/2008 | Sjoqvist | |
| 2008/0098717 A1 | 5/2008 | Orlando et al. | |
| 2010/0089019 A1 | 4/2010 | Knight et al. | |
| 2013/0283802 A1 | 10/2013 | Kim et al. | |
| 2015/0125293 A1 * | 5/2015 | Sheridan | F02C 3/107 415/229 |
| 2015/0226125 A1 | 8/2015 | Petty et al. | |
| 2016/0195019 A1 | 7/2016 | Roberge | |

* cited by examiner

TURBINE FRAME AND BEARING ARRANGEMENT FOR THREE SPOOL ENGINE

FIELD

The present subject matter relates generally to gas turbine engine architecture. More particularly, the present subject matter relates to a turbine section for gas turbine engines.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Conventional three spool gas turbine engines generally include a turbine section defining a high pressure turbine in serial flow arrangement with an intermediate pressure turbine and a low pressure turbine. However, known three-spool engines include a plurality of turbine frames to accommodate the various bearing assemblies supporting the three spools. Additionally, known three spool gas turbine engines that include interdigitated turbines are generally limited in a quantity of stages that may be interdigitated, due at least in part overhung masses. The combination of a plurality of turbine frames to support a three spool bearing configuration (e.g., the increased axial length and weight to the engine) plus limits on turbine interdigitation due to overhung masses therefore significantly limit actual and potential applications of interdigitated turbine sections.

Therefore, there is a need for structures that may enable further interdigitation of turbines in a turbine section. Additionally, there is a need for a turbine frame that may reduce axial length and weight to an engine.

Aspects and advantages of the invention will be set forth in part in the following description, or may be obvious from the description, or may be learned through practice of the invention.

The present disclosure is directed to a gas turbine engine defining a radial direction, a circumferential direction, an axial centerline along a longitudinal direction. The gas turbine engine defines an upstream end and a downstream end along the longitudinal direction and includes a turbine frame defined around the axial centerline. The turbine frame includes a first bearing surface, a second bearing surface, and a third bearing surface. The first bearing surface corresponds to a first turbine rotor, the second bearing surface corresponds to a second turbine rotor, and the third bearing surface corresponds to a third turbine rotor, and each turbine rotor is independently rotatable.

In one embodiment, one or more of the bearing surfaces each define an outer bearing race.

In various embodiments, the turbine frame defines a first platform to which the first bearing surface is coupled. In one embodiment, the turbine frame defines a second platform, to which the second bearing surface and the third bearing surface are each coupled. In another embodiment, the second platform is defined inward along the radial direction of the first platform. In still another embodiment, the first platform and/or the second platform defines a sleeve fitted to the turbine frame onto which a bearing assembly is coupled.

In still various embodiments, the first turbine rotor defines a low speed turbine. In one embodiment, the second turbine rotor and the third turbine rotor each define an intermediate speed turbine and a high speed turbine, respectively. In another embodiment, each turbine rotor defines a bearing assembly disposed between each respective bearing surface and each turbine rotor. In still another embodiment each bearing assembly defines a roller bearing, a ball bearing, a journal bearing, or combinations thereof.

In various embodiments, the turbine frame further includes a vane disposed within the core flowpath of the gas turbine engine. The vane includes a surface defining an airfoil. In one embodiment, the engine further includes an outer turbine casing disposed around the turbine frame. The turbine frame further includes a spoke extended generally along the radial direction from outward of the outer turbine casing, and coupled thereto, through one or more of the vanes of the turbine frame. In one embodiment, the turbine frame includes three or more spokes. In another embodiment, the turbine frame further includes a first bearing housing disposed inward of the vane along the radial direction. In still another embodiment, the spoke is coupled to the first bearing housing inward of the core flowpath of the engine. In yet another embodiment, the turbine frame further includes a second bearing housing disposed inward of the first bearing housing along the radial direction, and the second bearing housing is coupled to the first bearing housing. In still yet another embodiment, a first platform is coupled to the first bearing housing and a second platform is coupled to the second bearing housing. The first bearing surface is coupled to the first platform, and the second bearing surface and the third bearing surface are each coupled to the second platform.

In still various embodiments, the engine further includes a first turbine rotor defining a low speed turbine rotor. The first turbine rotor includes a plurality of connecting airfoils coupled to a rotor hub and the rotor hub coupled to a low pressure shaft. The plurality of connecting airfoils are coupled to an outer shroud and a plurality of outer shroud airfoils extend inward along the radial direction. A first stage of the plurality of outer shroud airfoils further includes an arm extended generally inward along the radial direction. The arm is coupled to an axially extended hub, in which a bearing assembly is disposed between the axially extended hub and the first bearing surface of the turbine frame. In one embodiment, the engine further includes a second turbine rotor defining an intermediate speed turbine rotor in which the second turbine rotor disposed upstream of the connecting airfoils of the first turbine rotor along the longitudinal direction. The second turbine rotor includes a bearing assembly disposed between the second turbine rotor and the second bearing surface. The engine further includes a third turbine rotor defining a high speed turbine rotor upstream of the turbine frame along the longitudinal direction in which the third turbine rotor includes a bearing assembly disposed between the third turbine rotor and the third bearing surface.

Another aspect of the present disclosure is directed to a method of operating a gas turbine engine with an interdigitated turbine section. The engine includes a fan rotor, an intermediate pressure compressor, a high pressure compressor, a combustion section, and a turbine section in serial flow arrangement. The turbine section includes, in serial flow arrangement, a high speed turbine rotor, a turbine frame, a first stage of a plurality of outer shroud airfoils of a low speed turbine rotor, an intermediate speed turbine rotor, and one or more additional stages of the low speed turbine rotor, the low speed turbine rotor coupled to the fan rotor via a low pressure shaft, the intermediate speed turbine rotor coupled to the intermediate pressure compressor via an intermediate pressure shaft, and the high speed turbine rotor coupled to the high pressure compressor via a high pressure shaft. The method includes rotating the high speed turbine rotor in a first direction or a second direction along the circumferential direction; rotating the low speed turbine rotor in the first direction along the circumferential direction; and rotating the intermediate speed turbine rotor in a second direction opposite of the first direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
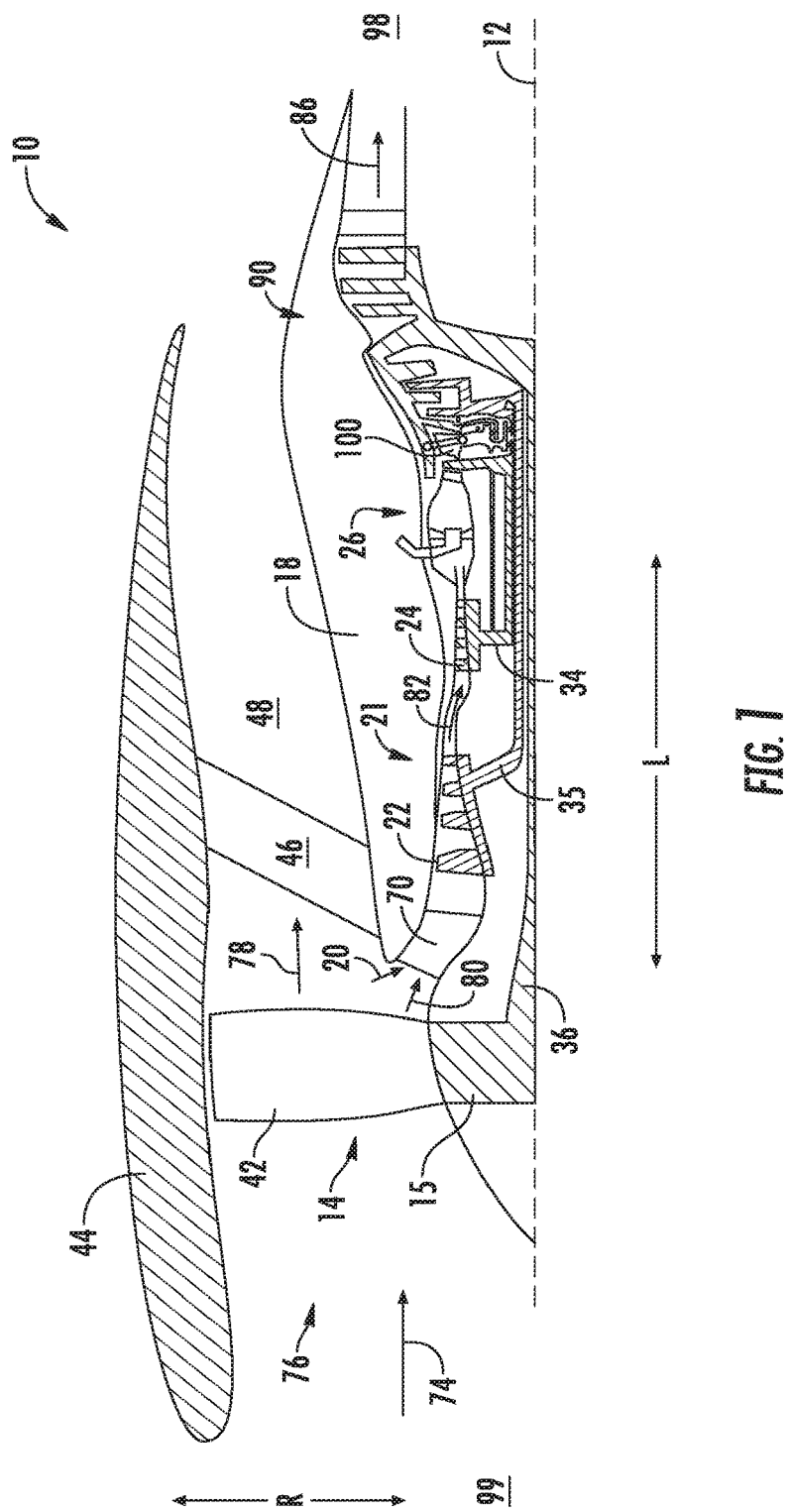
FIG. 1 is a schematic cross sectional view of an exemplary gas turbine engine incorporating an exemplary embodiment of a turbine section according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "low", "intermediate", "high", or their respective comparative degrees (e.g. -er, where applicable) each refer to relative speeds within an engine unless otherwise specified. For example, a "low turbine" or "low speed turbine" defines a rotational speed lower than a "high turbine" or "high speed turbine". Alternatively, unless otherwise specified, the aforementioned terms may be understood in their superlative degree. For example, a "low turbine" may refer to the lowest rotational speed turbine within a turbine section, and a "high turbine" may refer to the highest rotational speed turbine within the turbine section.

A gas turbine engine including a turbine frame including a first bearing surface, a second bearing surface, and a third bearing surface is generally provided. Each bearing surface corresponds to a first turbine rotor, a second turbine rotor, and a third turbine rotor, respectively, for a three spool turbine engine. The gas turbine engine shown and described herein may support an interdigitated turbine section, thereby reducing or removing adverse effects of an overhung mass of the interdigitated stages. Additionally, the turbine frame of the gas turbine engine provides support for each of three spools at the turbine section, thereby reducing axial length and weight of a gas turbine engine, and increasing overall efficiency and performance. The turbine frame and the gas turbine engine may enable application of interdigitated turbine sections into turbofan, turboprop, turboshaft, and prop fan engines for applications such as, but not limited to, aircraft propulsion. Furthermore, the gas turbine engine including one or more embodiments of the turbine frame described and shown herein may improve engine and aircraft efficiency and performance over known engines of similar axial and/or radial dimensions and/or thrust class.

Referring now to the drawings, FIG. 1 is a schematic cross sectional view of an exemplary gas turbine engine 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L and an upstream end 99 and a downstream end 98 along the longitudinal direction L. The upstream end 99 generally corresponds to an end of the engine 10 along the longitudinal direction L from which air enters the engine 10 and the downstream end 98 generally corresponds to an end at which air exits the engine 10, generally opposite of the upstream end 99 along the longitudinal direction L.

In general, the engine 10 may include a substantially tubular outer casing 18 that defines an annular inlet 20. The outer casing 18 encases or at least partially flows, in serial flow arrangement, a compressor section 21, a combustion section 26, and an interdigitated turbine section 90 (herein referred to as "turbine section 90"). Generally, the engine 10 defines, in serial flow arrangement from the upstream end 99 to the downstream end 98, a fan assembly 14, the compressor section 21, the combustion section 26, and the turbine section 90. In the embodiment shown in FIG. 1, the compressor section 21 defines a high pressure compressor (HPC) 24 and an intermediate pressure compressor (IPC) 22. In other embodiments, the fan assembly 14 may further include or define one or more stages of a plurality of fan blades 42 that are coupled to and extend outwardly in the radial direction R from a fan rotor 15 and/or a low pressure (LP) shaft 36. In various embodiments, multiple stages of the plurality of fan blades 42 coupled to the LP shaft 36 may be referred to as a low pressure compressor (LPC).

An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

Figure 2:
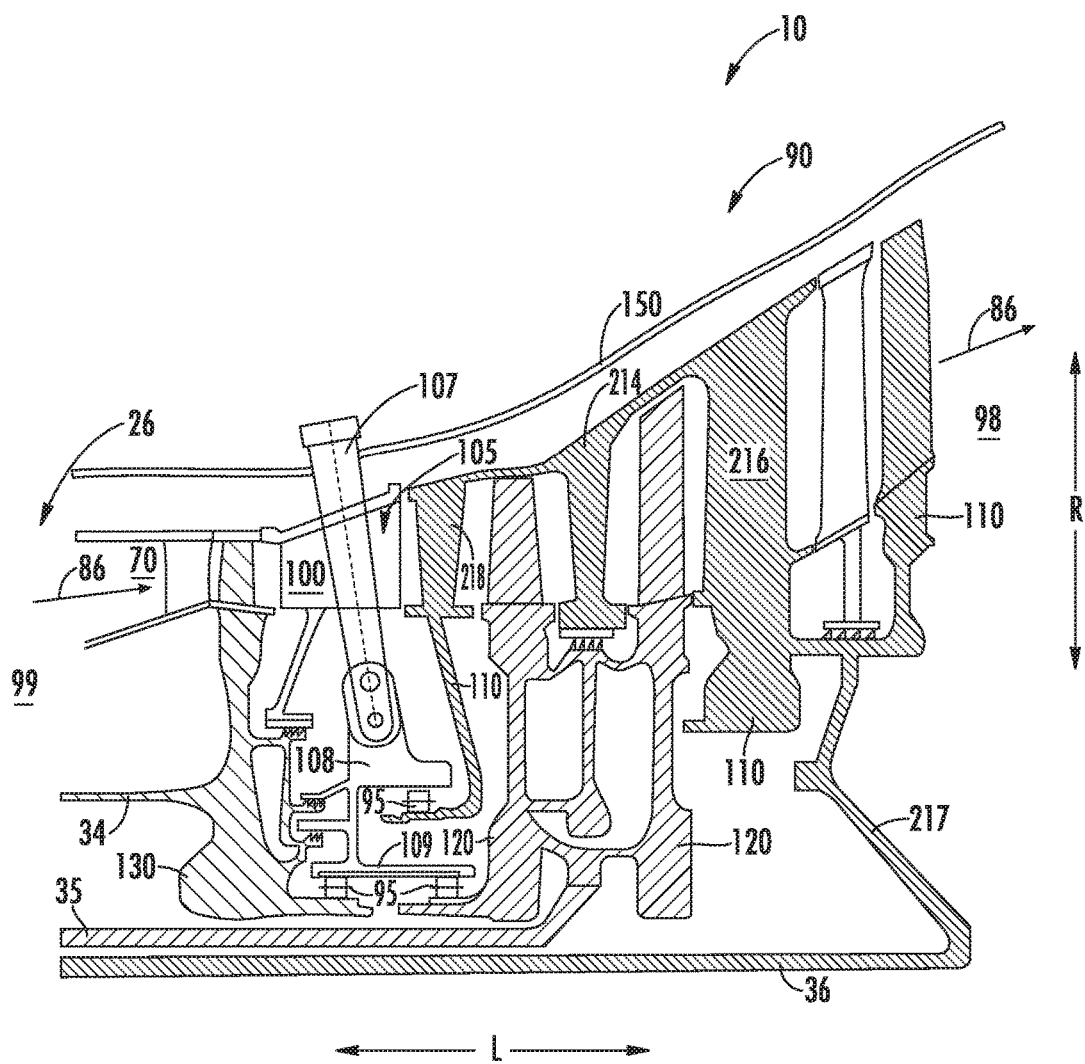
FIG. 2 is a schematic cross sectional view of an embodiment of the turbine section shown in FIG. 1.
Figure 3:
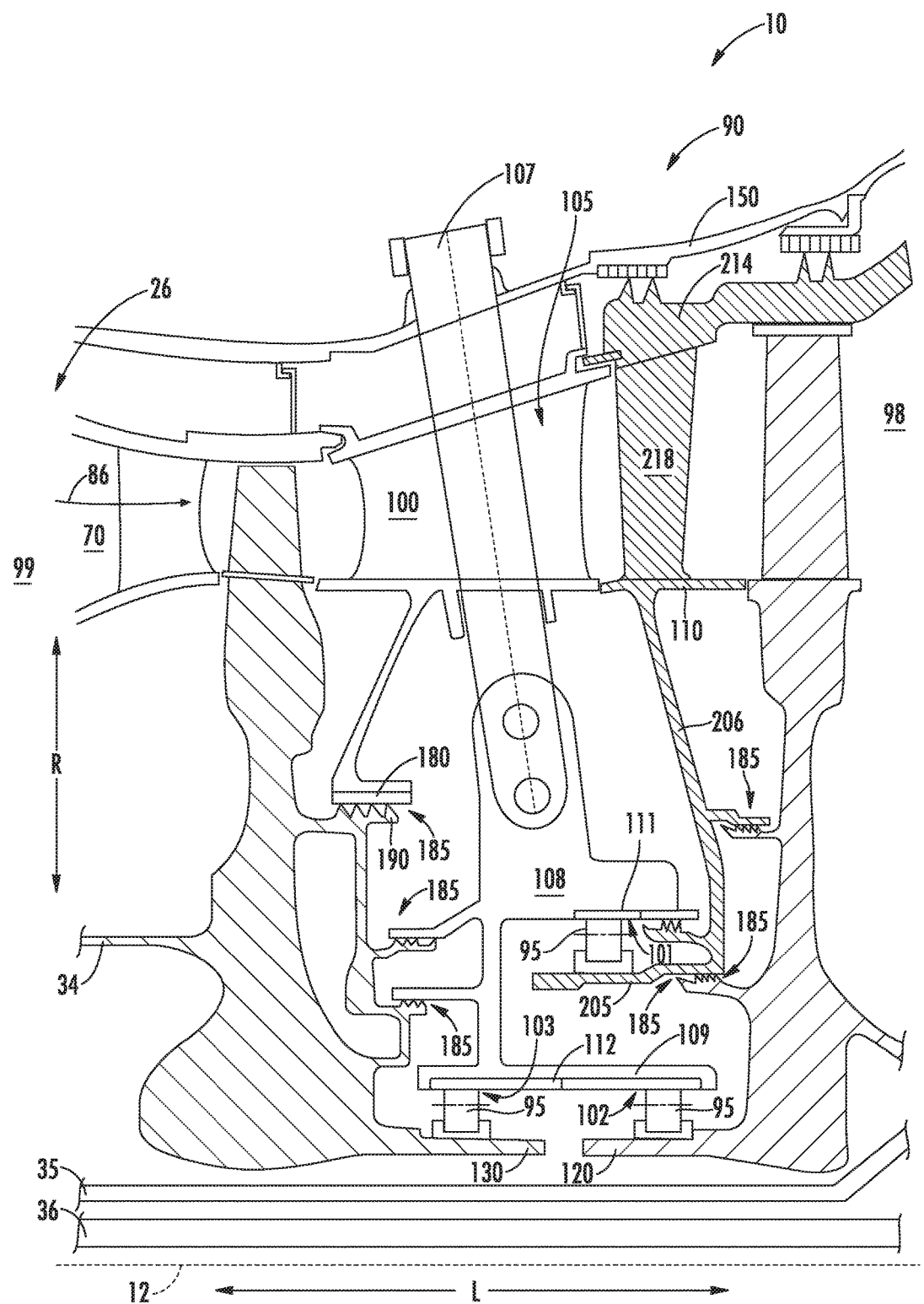
FIG. 3 is a schematic cross sectional view of an embodiment of a turbine frame and the turbine section.

Referring now to FIG. 2, an exemplary embodiment of the turbine section 90 of the engine 10 shown in FIG. 1 is provided in further detail. In FIG. 3, an exemplary embodiment of a turbine frame 100 of the turbine section 90 is provided in further detail. The turbine section 90 includes a first turbine rotor 110, a second turbine rotor 120, and a third turbine rotor 130. The first, second, and third turbine rotors 110, 120, 130 are each independently rotatable i.e., one or several turbine rotors 110, 120, 130 may rotate without necessarily rotating another or several turbine rotors 110, 120, 130.

Referring now to FIGS. 1-3, in various embodiments, the first turbine rotor 110 defines a low speed turbine rotor drivingly coupled to the LP shaft 36 extended along the longitudinal direction L and generally concentric about the axial centerline 12. The LP shaft 36 is connected to the fan assembly 14 and driven in rotation by the first turbine rotor 110 defining the low speed turbine.

In still various embodiments, the second turbine rotor 120 defines an intermediate speed turbine rotor drivingly connected and rotatable with an intermediate pressure (IP) shaft 35 extended along the longitudinal direction L and generally concentric about the axial centerline 12. The IP shaft 35 is connected to the IPC 22 and driven in rotation by the second turbine rotor 120 defining the intermediate speed turbine rotor.

Referring still to FIGS. 1-3, the third turbine rotor 130 of the turbine section 90 is drivingly connected to and rotatable with a high pressure (HP) shaft 34 extended along the longitudinal direction L and generally concentric about the axial centerline 12. The HP shaft 34 is connected to the HPC 24 and driven in rotation by the third turbine rotor 130 defining the high speed turbine rotor.

During operation of the engine 10 as shown collectively in FIGS. 1-3, the second turbine rotor 120 rotates generally at a higher rotational speed than the first turbine rotor 110. The third turbine rotor 130 rotates generally at a higher speed than the second turbine rotor 120. During operation of the engine 10, a volume of air as indicated schematically by arrows 74 enters the engine 10 through an associated inlet 76 of the nacelle and/or fan assembly 14. As the air 74 passes across the fan blades 42, a portion of the air as indicated schematically by arrows 78 is directed or routed into the bypass airflow passage 48 while another portion of the air as indicated schematically by arrows 80 is directed through the fan assembly 14 into a core flowpath 70 defined through the compressor section 21, the combustion section 26, and the turbine section 90. Air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 90, causing rotary members of the turbine section 90 to rotate and support operation of respectively coupled rotary members in the compressor section 21 and/or fan assembly 14.

Referring back to FIGS. 2-3, the turbine frame 100 is defined around the axial centerline 12 of the engine 10. The turbine frame 100 includes a first bearing surface 101, a second bearing surface 102, and a third bearing surface 103. The first bearing surface 101 corresponds to the first turbine rotor 110, the second bearing surface 102 corresponds to the second turbine rotor 120, and the third bearing surface 103 corresponds to the third turbine rotor 130.

Each bearing surface 101, 102, 103 generally provides an area of contact between the static or stationary turbine frame 100 and the rotating turbine rotors 110, 120, 130. In various embodiments of the engine 10, one or more bearings 95 is disposed between each bearing surface 101, 102, 103 and each respective turbine rotor 110, 120, 130. For example, the bearings 95 may define a roller bearing, a ball bearing, a journal bearing, or combinations thereof. As another non-limiting example, the bearings 95 may define bearing assemblies, i.e., a rolling element bearing including an outer race and an inner race on which the rolling element rides or rolls upon.

The turbine frame 100 may provide support for three rotor spools of the engine 10 (i.e., the first turbine rotor 110, the second turbine rotor 120, and the third turbine rotor 130). In various embodiments, the turbine frame 100 may provide support for a three spool interdigitated turbine section. For example, in the embodiment shown in FIGS. 1 and 2, the engine 10 defines, in serial flow arrangement from the upstream end 99 to the downstream end 98, the third turbine rotor 130 defining the high speed turbine rotor, the turbine frame 100, the first turbine rotor 110 defining the low speed turbine rotor, and the second turbine rotor 120 defining the intermediate speed turbine rotor. In various embodiments, the first turbine rotor 110 and second turbine rotor 120 are interdigitated along the longitudinal direction L, i.e., there are iterations of the first and second turbine rotors 110, 120. The turbine frame 100 shown and described herein may further provide support for a first stage of the first turbine rotor 110. Such support may enable further interdigitation of the first and second turbine rotors 110, 120 (i.e., more stages of the first turbine rotor 110 extended toward the upstream end 99 with a plurality of stages of the second turbine rotor 120 disposed among the first turbine rotor 110 stages).

In still various embodiments, one or more of each bearing surface 101, 102, 103 may be generally parallel to the axial centerline 12. Alternatively, one or more of each bearing surface 101, 102, 103 may be perpendicular to the force applied by each respective turbine rotor 110, 120, 103. In one embodiment, one or more of each bearing surface 101, 102, 103 may be tapered at an acute angle relative to the axial centerline 12. For example, the bearing surface 101, 102, 103 may define an angled surface against which the bearing assembly 95, defining a tapered roller bearing or thrust bearing, may exert force in at least the longitudinal direction L and the radial direction R.

In various embodiments, one or more of each bearing surface 101, 102, 103 defines a bearing race, such as that onto which a rolling element bearing rides. In one embodiment, one or more of each bearing surface 101, 102, 103 defines an outer bearing race on which the bearing assembly 95 rides.

In still various embodiments, the turbine frame 100 defines a first platform 111 onto which the first bearing surface 101 is coupled. The turbine frame 100 may further define a second platform 112 onto which the second bearing surface 102 and the third bearing surface 103 are each coupled. In one embodiment, the second platform 112 is defined inward along the radial direction R of the first platform 111. Each platform 111, 112 may define an annular surface or bore on the turbine frame 100 inward of the core flowpath 70 of the engine 10.

In one embodiment, each platform 111, 112 defines each respective bearing surface 101, 102, 103 via dimensional and geometrical tolerances appropriate for bearings 95 and/or outer races on which bearings 95 ride.

In another embodiment, each platform 111, 112 defines a sleeve fitted to the turbine frame 100 on which each bearing assembly 95 is installed or coupled. In various embodiments, the turbine frame 100 at each platform 111, 112 may define a surface roughness or a fit, such as a loose fit, tight fit, or interference fit, onto which the bearing assembly 95 is coupled to the turbine frame 100. In still various embodiments, each turbine rotor 110, 120, 130 may define a surface roughness or a fit, such as a loose fit, tight fit, or interference fit at each turbine rotor 110, 120, 130 corresponding to each platform 111, 112.

Referring still to FIGS. 2-3, the turbine frame 100 further includes a vane 105 disposed within the core flowpath 70 of the engine 10. The vane 105, or a plurality thereof in circumferential arrangement about the axial centerline 12, includes a surface defining an airfoil. The airfoil defines a suction side, a pressure side, a leading edge, and a trailing edge. The vane 105 may define a static or stationary turning vane, in which combustion gases 86 flowing from the combustion section 26 toward the downstream end 98 may accelerate at least partially along a circumferential direction about the axial centerline 12 as the combustion gases 86 flow past the vane 105. In this fashion, the vane 105 may align or match a velocity of the combustion gases 86 along the circumferential direction to the turbine rotors 101, 102 downstream of the vane 105.

Referring back to FIGS. 1-3, the engine 10 may further include an outer turbine casing 150 disposed around the turbine frame 100. The outer turbine casing 150 may further be disposed around the first, second, and/or third turbine rotors 110, 120, 130. The turbine frame 100 may further include a spoke 107 extended generally along the radial direction R through the one or more of the vanes 105 of the turbine frame 100. The spoke 107 may be coupled to the outer turbine casing 150 and extend from outward of the outer turbine casing 150 through the vane 105.

In one embodiment, the turbine frame 100 further includes a first bearing housing 108 disposed inward of the vane 105 along the radial direction R. The spoke 107 is coupled to the first bearing housing 108. In various embodiments, the turbine frame 100 may define a plurality of spokes 107 to set or adjust the first bearing housing 108 relative to the axial centerline 12. For example, the plurality of spokes 107 may each include adjustable linkages that adjust each spoke 107 linearly. The spokes 107 may be disposed circumferentially equidistant about the centerline 12 so as to enable adjusting concentricity of the first bearing housing 108 relative to the outer turbine case 150 and/or the axial centerline 12. In one embodiment, the turbine frame 100 defines three or more spokes 107.

In another embodiment, the turbine frame 100 further includes a second bearing housing 109 coupled to and disposed inward of the first bearing housing 108 along the radial direction R. In various embodiments, the first platform 111 is coupled to the first bearing housing 108 and the second platform 112 is coupled to the second bearing housing 109. In such an embodiment, adjusting the spokes 107 may further adjust concentricity of the second bearing housing 109 relative to the outer turbine case 150 and/or the axial centerline 12.

Referring still to FIGS. 2-3, the first turbine rotor 110 includes a connecting airfoil 216 coupling a rotor hub 217 to an outer shroud 214 extended along the longitudinal direction L toward the upstream end 99. The rotor hub 217 is coupled to the LP shaft 36 on an inward end in the radial direction R. A plurality of the connecting airfoils 216 are coupled to the rotor hub 217 in circumferential arrangement. A radially outward end of the connecting airfoils 216 couples the outer shroud 214. A plurality of outer shroud airfoils 218 are coupled to the outer shroud 214 and extend inward along the radial direction R.

The plurality of outer shroud airfoils 218 at the first stage of the first turbine rotor 110 may further be coupled to an axially extended hub 205 disposed inward along the radial direction R of the plurality of outer shroud airfoils 218 at the first stage. In one embodiment, the plurality of outer shroud airfoils 218 at the first stage is further coupled to an arm 206 extended generally inward along the radial direction R. The arm 206 is coupled to the axially extended hub 205 in which the axially extended hub 205 extends generally in the longitudinal direction L toward the upstream end 99.

In the embodiment shown in FIGS. 2-3, the first turbine rotor 110 defining a low speed turbine is interdigitated among the second turbine rotor 120 defining an intermediate speed turbine. The first turbine rotor 110 is interdigitated via the outer shroud 214 extended radially outward of the second turbine rotor 120 and extended along the longitudinal direction L toward the upstream end 99. The turbine frame 100 further supports the first turbine rotor 110 toward the upstream end 99 via the first bearing surface 101 in contact with the bearing assembly 95 at the axially extended hub 205 of the first turbine rotor 110 at its first stage (i.e., the plurality of outer shroud airfoils 218 immediately downstream of the turbine frame 100).

Still further, in the embodiment shown in FIGS. 2-3, the turbine frame 100 supports the second turbine rotor 120 and the third turbine rotor 130 at the second bearing surface 102 and the third bearing surface 103, respectively. In the embodiment provided, the second and third bearing surfaces 102, 103 are each advantageously disposed radially inward of the first bearing surface 101. The first bearing surface 101 is disposed radially outward toward the overhung outer shroud 214 of the first turbine rotor 110 to provide support while reducing an amount of mass overhung or cantilevered from the upstream end of the outer shroud 214.

Furthermore in the embodiment shown in FIGS. 2-3, the first turbine rotor 110 defines two stages extended from the outer shroud 214 in addition to the connecting airfoils 216. Two stages of the second turbine rotor 120 defining the intermediate speed turbine are disposed among the two stages of outer shroud airfoils 218 and the connecting airfoils 216 each of the first turbine rotor 110. However, in other embodiments, the turbine frame 100 may further enable additional stages of the second turbine rotor 120 to be interdigitated with additional stages of the outer shroud airfoils 218 of the outer shroud 214 and the connecting airfoils 216. For example, in various embodiments, the first turbine rotor 110 may define between two and six stages (inclusively) of the plurality of outer shroud airfoils 218 upstream of the connecting airfoils 216. In other embodiments, the second turbine rotor 120 may define between two and six stages (inclusively) of the second turbine rotor 120 disposed upstream of the connecting airfoils 216 of the first turbine rotor 110.

Referring still to FIGS. 2-3, the turbine frame 100 and one or more of the turbine rotors 110, 120, 130 may together define a seal interface 185 including a shroud 180 and a seal 190. In various embodiments, the one or more shrouds 180 may define a wall or platform extended at least partially in the longitudinal direction L. In one embodiment, the shroud 180 is adjacent to the seals 190 in the radial direction R. The one or more seals 190 may define a knife fin or knife edge seal that extended generally toward the shroud 180 to define a generally pointed end that may contact the shroud 180. The shrouds 180, seals 190, or other portions of the turbine section 90 may further include coatings on surfaces of the shrouds 180 and/or seals 190, such as, but not limited to, thermal coatings, including one or more layers of bond coats and thermal coats, or abrasives such as diamond or cubic boron nitride, aluminum polymer, aluminum boron nitride, aluminum bronze polymer, or nickel-chromium-based abradable coatings. Coatings may be applied by one or more methods, such as plasma spray, thermal spray, gas phase, or other methods.

Figure 4:
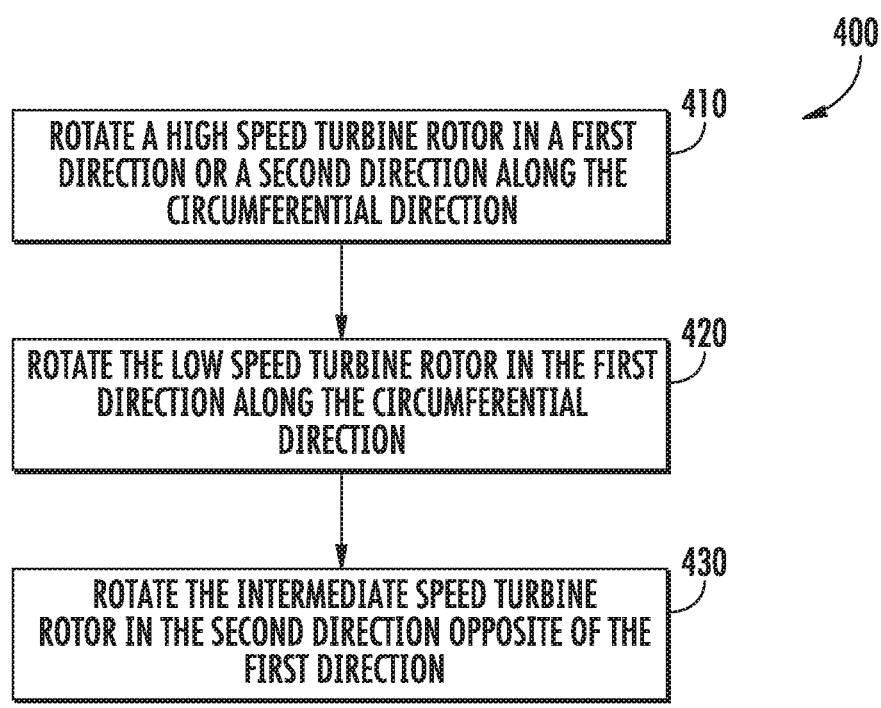
FIG. 4 is an outline of an exemplary method of operating the gas turbine engine shown in FIGS. 1-3.

Referring now to FIG. 4, a method of operating a gas turbine engine with an interdigitated turbine section 300 is generally provided (herein referred to as "method 400"). The method 400 may depict steps for operating a gas turbine engine including an interdigitated turbine section incorporating a turbine frame such as the engine 10 and turbine frame 100 shown and described in regard to FIGS. 1-2. FIG. 3 depicts steps performed in a particular order for the purposes of illustration and discussion. Those of ordinary skill in the art, using the disclosures provided herein, will understand that various steps of any of the methods disclosed herein may be adapted, modified, rearranged, omitted, or expanded in various ways without deviating from the scope of the present disclosure.

The method 400 at 410 may include rotating the high speed turbine rotor in a first direction or a second direction along the circumferential direction; at 420 rotating the low speed turbine rotor in the first direction along the circumferential direction; and at 430 rotating the intermediate speed turbine rotor in the second direction opposite of the first direction.

The method 400 and the turbine section 90 shown and described herein may improve upon existing turbine sections by providing improved fuel efficiency, operational efficiency, and/or power output while maintaining or reducing weight, part count, and/or packaging. The first turbine rotor 110 interdigitated among the second turbine rotor 120 may reduce packaging and reduce part count by removing stages of stationary airfoils between each rotating component. The turbine frame 100 may enable further interdigitation of the first turbine rotor 110 and the second turbine rotor 120 by providing support to the overhung first turbine rotor 110. The turbine frame 100 may further reduce engine packaging or axial length by providing three spool support at a single turbine frame 100. Additionally, the turbine section 90 may provide efficiency benefits comparable to a reduction gearbox without adding weight or size (e.g. axial length) to the engine 10.

The various embodiments of the turbine section 90 generally shown and described herein may be constructed as individual blades installed into drums or hubs, or integrally bladed rotors (IBRs) or bladed disks, or combinations thereof. The blades, hubs, or bladed disks may be formed of ceramic matrix composite (CMC) materials and/or metals appropriate for gas turbine engine hot sections, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium. The turbine section 90, or portions or combinations of portions thereof, may be formed using additive manufacturing or 3D printing, or casting, forging, machining, or castings formed of 3D printed molds, or combinations thereof. The turbine section 90, or portions thereof, may be mechanically joined using fasteners, such as nuts, bolts, screws, pins, or rivets, or using joining methods, such as welding, brazing, bonding, friction or diffusion bonding, etc., or combinations of fasteners and/or joining methods. Still further, it should be understood that the first turbine rotor 110 may incorporate features that allow for differential expansion. Such features include, but are not limited to, aforementioned methods of manufacture, various shrouds, seals, materials, and/or combinations thereof.

The systems and methods shown in FIGS. 1-4 and described herein may decrease fuel consumption, increase operability, increase engine performance and/or power output while maintaining or reducing weight, part count, and/or packaging (e.g. radial and/or axial dimensions). The systems provided herein may allow for increased high bypass ratios and/or overall pressure ratios over existing gas turbine engine configurations, such as turbofans, while maintaining or reducing packaging relative to other gas turbine engines of similar power output. The systems described herein may contribute to improved bypass ratio and/or overall pressure ratio and thereby increase overall gas turbine engine efficiency.

Still further, the systems and methods shown in FIGS. 1-4 and described herein may reduce a product of a flow area and the square of the rotational speed (the product herein referred to as "$AN^2$") of the gas turbine engine. For example, engine 10 shown and described in regard to FIGS. 1-4 may generally reduce $AN^2$ relative to a conventional geared turbofan configuration. Generally, lowering the $AN^2$, such as by reducing the rotational speed and/or the flow area, increases the required average stage work factor (i.e. the average required loading on each stage of rotating airfoils). However, the systems described herein may lower the $AN^2$ while also lowering the average stage work factor and maintaining axial length of the turbine section 90 (compared to engines of similar thrust output and packaging) by interdigitating the first turbine rotor 110 among the one or more stages of the second turbine rotor 120 and the third turbine rotor 130 while also defining a non-digitated turbine structure toward the downstream end 98 of the turbine section 90. Therefore, the first turbine rotor 110 may increase the quantity of rotating stages of airfoils while reducing the average stage work factor, and therefore the $AN^2$, while mitigating increases in axial length to produce a similar $AN^2$ value. The first turbine rotor 110 may further reduce the $AN^2$ while additionally reducing the overall quantity of airfoils, rotating and stationary, in the turbine section 90 relative to turbine sections of gas turbine engines of similar power output and/or packaging.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, wherein the gas turbine engine defines a radial direction, a circumferential direction, an axial centerline along a longitudinal direction, and wherein the gas turbine engine defines an upstream end and a downstream end along the longitudinal direction, the gas turbine engine comprising:
a turbine frame defined around the axial centerline, the turbine frame comprising a first platform to which a first bearing surface is coupled, and further wherein the turbine frame comprises a second bearing surface and a third bearing surface, wherein the first bearing surface corresponds to a first turbine rotor, the second bearing surface corresponds to a second turbine rotor, and the third bearing surface corresponds to a third turbine rotor, and wherein each turbine rotor is independently rotatable.

2. The gas turbine engine of claim 1, wherein one or more of the bearing surfaces each define an outer bearing race.

3. The gas turbine engine of claim 1, wherein the turbine frame defines a second platform, and wherein the second bearing surface and the third bearing surface are each coupled to the second platform.

4. The gas turbine engine of claim 3, wherein the second platform is defined inward along the radial direction of the first platform.

5. The gas turbine engine of claim 3, wherein the first platform and/or the second platform defines a sleeve fitted to the turbine frame onto which a bearing assembly is coupled.

6. The gas turbine engine of claim 1, wherein the first turbine rotor defines a low speed turbine.

7. The gas turbine engine of claim 6, wherein the second turbine rotor and the third turbine rotor each define an intermediate speed turbine and a high speed turbine, respectively.

8. The gas turbine engine of claim 7, wherein each turbine rotor defines a bearing assembly disposed between each respective bearing surface and each turbine rotor.

9. The gas turbine engine of claim 8, wherein each bearing assembly defines a roller bearing, a ball bearing, a journal bearing, or combinations thereof.

10. The gas turbine engine of claim 1, wherein the turbine frame further comprises a vane disposed within the core flowpath of the gas turbine engine, wherein the vane comprises a surface defining an airfoil.

11. The gas turbine engine of claim 10, the engine further comprising:
an outer turbine casing disposed around the turbine frame, and wherein the turbine frame further comprises a spoke extended generally along the radial direction from outward of the outer turbine casing, and coupled thereto, through one or more of the vanes of the turbine frame.

12. The gas turbine engine of claim 11, wherein the turbine frame comprises three or more spokes.

13. The gas turbine engine of claim 11, wherein the turbine frame further comprises a first bearing housing disposed inward of the vane along the radial direction.

14. The gas turbine engine of claim 13, wherein the spoke is coupled to the first bearing housing inward of the core flowpath of the engine.

15. The gas turbine engine of claim 13, wherein the turbine frame further comprises a second bearing housing disposed inward of the first bearing housing along the radial direction, and wherein the second bearing housing is coupled to the first bearing housing.

16. The gas turbine engine of claim 13, wherein a first platform is coupled to the first bearing housing, and wherein a second platform is coupled to the second bearing housing, and further wherein the first bearing surface is coupled to the first platform, and wherein the second bearing surface and the third bearing surface are each coupled to the second platform.

17. The gas turbine engine of claim 1, the engine further comprising:
a first turbine rotor defining a low speed turbine rotor, the first turbine rotor comprising a plurality of connecting airfoils coupled to a rotor hub, the rotor hub coupled to a low pressure shaft, and wherein the plurality of connecting airfoils are coupled to an outer shroud, and wherein a plurality of outer shroud airfoils extend inward along the radial direction, and wherein a first stage of the plurality of outer shroud airfoils further comprises an arm extended generally inward along the radial direction, and wherein the arm is coupled to an axially extended hub, and wherein a bearing assembly is disposed between the axially extended hub and the first bearing surface of the turbine frame.

18. The gas turbine engine of claim 17, the engine further comprising:
a second turbine rotor defining an intermediate speed turbine rotor, the second turbine rotor disposed upstream of the connecting airfoils of the first turbine rotor along the longitudinal direction, wherein the second turbine rotor comprises a bearing assembly disposed between the second turbine rotor and the second bearing surface; and
a third turbine rotor defining a high speed turbine rotor upstream of the turbine frame along the longitudinal direction, wherein the third turbine rotor comprises a bearing assembly disposed between the third turbine rotor and the third bearing surface.

19. A method of operating a gas turbine engine with an interdigitated turbine section, wherein the engine comprises a fan rotor, an intermediate pressure compressor, a high pressure compressor, a combustion section, and a turbine section in serial flow arrangement, wherein the turbine section comprises, in serial flow arrangement, a high speed turbine rotor, a turbine frame, a first stage of a plurality of outer shroud airfoils of a low speed turbine rotor, an intermediate speed turbine rotor, and one or more additional stages of the low speed turbine rotor, the low speed turbine rotor coupled to the fan rotor via a low pressure shaft, the intermediate speed turbine rotor coupled to the intermediate pressure compressor via an intermediate pressure shaft, and the high speed turbine rotor coupled to the high pressure compressor via a high pressure shaft, the method comprising:
rotating the high speed turbine rotor in a first direction or a second direction along the circumferential direction;
rotating the low speed turbine rotor in the first direction along the circumferential direction; and
rotating the intermediate speed turbine rotor in a second direction opposite of the first direction.

* * * * *